(12) United States Patent
Lipawsky

(10) Patent No.: US 6,409,335 B1
(45) Date of Patent: Jun. 25, 2002

(54) FOLDABLE EYEWEAR

(75) Inventor: Steven R. Lipawsky, 6767 NW. 84 Ave., Parkland, FL (US) 33067

(73) Assignee: Steven R. Lipawsky, Miami, FL (US)

( * ) Notice: Subject to any disclaimer, the term of this patent is extended or adjusted under 35 U.S.C. 154(b) by 0 days.

(21) Appl. No.: 09/716,246

(22) Filed: Nov. 21, 2000

Related U.S. Application Data

(60) Provisional application No. 60/168,019, filed on Nov. 30, 1999.

(51) Int. Cl.[7] .............................. G02C 5/08; G02C 5/02
(52) U.S. Cl. ........................ 351/63; 351/47; 351/124; 351/133
(58) Field of Search .............................. 351/63, 47, 57, 351/48, 58, 124, 126, 133; 2/454

(56) References Cited

U.S. PATENT DOCUMENTS

| | | | |
|---|---|---|---|
| 1,230,555 A | 6/1917 | Brennecke | 351/63 |
| 1,936,319 A * | 11/1933 | Wingate | 351/63 |
| 2,814,968 A * | 12/1957 | Nixon, Jr. | 351/63 |
| 4,711,539 A | 12/1987 | Krusas et al. | 351/63 |
| 5,473,395 A | 12/1995 | Huang | 351/63 |
| 5,642,177 A | 6/1997 | Nishioka | 351/47 |
| 5,646,708 A | 7/1997 | Bolle | 351/153 |
| 5,896,185 A | 4/1999 | Huang | 351/63 |

FOREIGN PATENT DOCUMENTS

| | | | |
|---|---|---|---|
| DE | 3230234 A1 | 8/1982 | 351/63 |

* cited by examiner

*Primary Examiner*—Huy Mai

(57) ABSTRACT

Foldable eyewear includes first and second lens rims, a bridge portion between the first and second lens rims, connectors between the bridge and the first and second lens rims, and at least one spring positioned at a folding hinge that rotatably joins the bridge portion and a lens rim-bridge connector. The spring-hinged mechanism that joins the bridge portion and a lens rim-bridge connector allows the user to fold one lens rim on top of the other for compact storage while preventing unwanted instability and unwanted transitions between the folded and unfolded positions. The spring-hinged mechanism allows the lens rim-bridge connector to "hyper-extend" relative to the bridge portion to absorb impact/force without breaking.

15 Claims, 7 Drawing Sheets

FOLDABLE EYEWEAR

REFERENCE TO RELATED APPLICATION

This application claims priority under 35 U.S.C. 517 119(e) of U.S. Provisional Application No. 60/168,019 filed on Nov. 30, 1999, the entire contents of which are incorporated herein by reference.

BACKGROUND OF THE INVENTION

1. Field of the Invention

The present invention relates to foldable eyewear, and more particularly to a foldable eyewear design having a spring-hinged connection between a bridge and a lens rim that allows the eyewear to be folded for compact storage.

2. Description of Related Art

Various types of eyewear have been designed to include foldable components that allow a user to store eyewear more compactly. For instance, one known design for glasses, exemplified by embodiments in U.S. Pat. No. 5,896,186 to Huang, has retractable temples and a foldable bridge that allows the user to fold the glasses such that the two lens rims are side-by-side for storage. The benefits of such a design are limited however because the two lens rims are folded side-by-side, thereby resulting in considerable surface area that must be accommodated in the storage container, even when folded.

Another known eyewear design, exemplified by embodiments in U.S. Pat. No. 5,642,177 to Nishioka, provides a detachable sunglass "front" with a hinged bridge that allows the user to fold the two lens rims of the detachable sunglass front one on top of the other for compact storage. This configuration, however, is prone to unwanted movement of the rims as the hinge loosens after repeated use and does not allow the eyewear to "give" when exposed to force/impact from the front.

SUMMARY OF THE INVENTION

The present invention is directed to foldable eyewear having first and second lens rims, a bridge portion between the first and second lens rims, connectors between the bridge and the first and second lens rims, and at least one spring positioned at a folding hinge that rotatably joins the bridge portion and a lens rim-bridge connector. The spring-hinged mechanism that joins the bridge portion and a lens rim-bridge connector allows the user to fold one lens rim on top of the other for compact storage while preventing unwanted instability and transitions between the folded and unfolded positions. The spring-hinged mechanism allows the lens rim-bridge connector to "hyper-extend" relative to the bridge portion to absorb impact/force without breaking.

According to one embodiment of the present invention, each lens rim-bridge connector includes a forked end portion that fits over and engages with a stepped end portion of the bridge and includes a hollow cavity for housing a spring. The spring in the hollow cavity of each connector is compressed by the force exerted by an edge of the corresponding stepped end portion of the bridge. The force against the bridge exerted by the compressed springs provides stable, yet rotatable, connections between the bridge and the lens rim-bridge connectors. According to another embodiment of the present invention, the bridge includes two forked end portions that respectively fit over and rotatably join with stepped end portions of the lens rim-bridge connectors. At least one forked end portion of the bridge includes a hollow cavity for housing a spring. The spring is compressed by a force exerted by an edge of the stepped end portion of a lens rim-bridge connector. The force against the lens rim-bridge connector exerted by the compressed spring provides a stable, yet rotatable, connection between the bridge and the lens rim-bridge connector.

BRIEF DESCRIPTION OF THE DRAWINGS

The present invention will become more fully understood from the detailed description given hereinbelow and the accompanying drawings, wherein.

DETAILED DESCRIPTION

The present invention is directed to foldable eyewear, such as clip-on sunglass fronts, (i.e., lens rims connected by a bridge but without temples), having a spring-hinged connection between a bridge and a lens rim that allows the eyewear to be folded for compact storage. Two separate exemplary embodiments of the present invention will be described below with reference to the Figures. A first embodiment of the present invention will be described with reference to FIGS. 1A–3B and a second embodiment of the present invention will be described with reference to FIGS. 4A–6B.

Figure 1A:
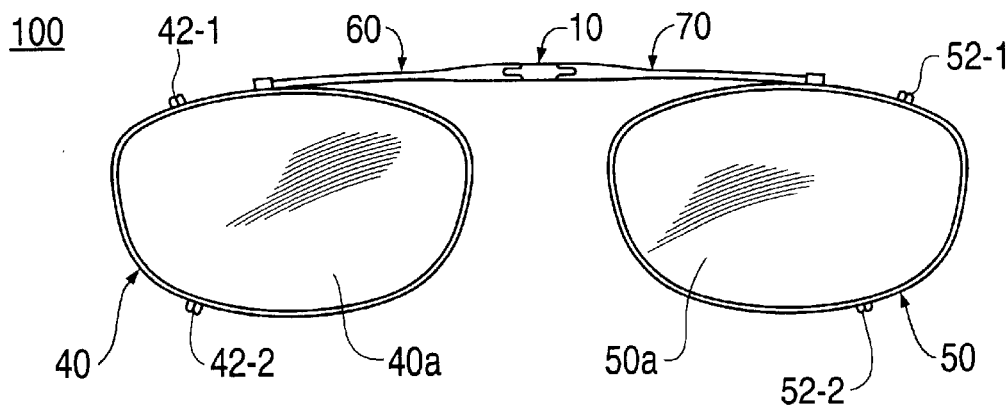
FIGS. 1A, 1B, and 1C are perspective views of foldable eyewear according to a first embodiment of the present invention, showing the foldable eyewear in a fully opened position, a partially closed position, and a fully closed position, respectively.
Figure 1B:
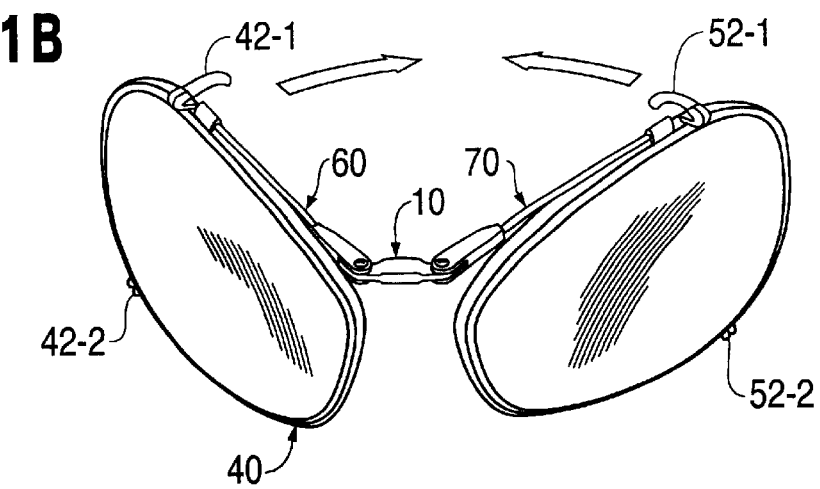
Figure 1C:
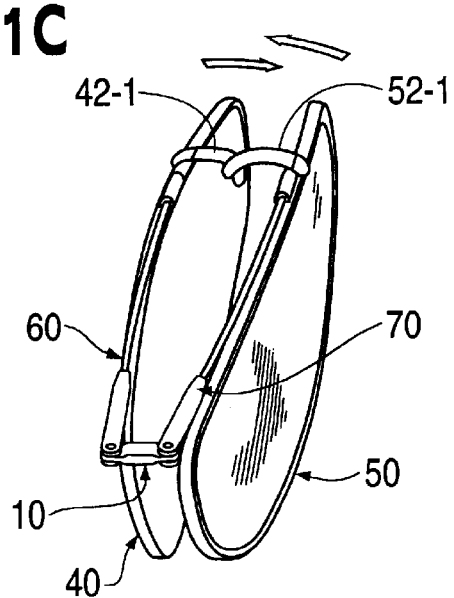

FIGS. 1A–1C are perspective views of foldable eyewear 100 according to a first embodiment of the present invention. As shown in FIG. 1A, the eyewear 100 includes: a first lens rim 40 enclosing a first lens 40a; a second lens rim 50 enclosing a second lens 50a; a bridge 10; a first lens rim-bridge connector 60 attached at one end to the first lens rim 40 and connected to an opposite end to a first end of the bridge 10; and a second lens rim-bridge connector 70 attached at one end to the second lens rim 50 and connected at an opposite end to a second end of the bridge 10. The eyewear 100 illustrated in FIGS. 1A–1C is a pair of auxiliary glasses, such as clip-on sunglass fronts or safety lenses. To enable attachment of the eyewear 100 to a pair of primary glasses (not shown), the eyewear 100 further includes protruding hooks 42-1, 42-2 (on the first lens rim 40) and 52-1, 52-2 (on the second lens rim 50) for attaching and securing the eyewear 100 to the rims of the user's primary glasses. These hooks 42-1, 42-2, 52-1, and 52-2 can be more clearly seen in FIGS. 1B and 1C. It should be recognized that the inventive principles of the present invention may be applied to other types of eyewear, including prescription glasses (i.e., including temples).

FIG. 1A shows the eyewear 100 in a fully opened position. FIG. 1B illustrates the eyewear 100 in a partially folded position. As seen in FIG. 1B, the first lens rim-bridge connector 60 and the bridge 10 are joined to provide an axis of rotation about which the first lens rim 40 rotates. Likewise, the second lens rim-bridge connector 70 and the bridge 10 are joined to provide an axis of rotation about which the second lens rim 50 rotates. As seen in FIG. 1C, the first lens rim 40 and the second lens rim 50 each rotate about their respective axes of rotation in an arc of approximately 90° to reach a fully-folded position in which the first lens rim 40 and the second lens rim 50 are positioned one on top of the other (i.e., substantially parallel). Thus, the eyewear 100, in the fully closed position illustrated in FIG. 1C, is compact and may be easily stored. As seen for example in FIG. 1C, the protruding hooks 42-1, 42-2, 52-1, 52-2 on the opposing lens rims 40, 50 are positioned so as to cross upon folding.

Figure 2A:
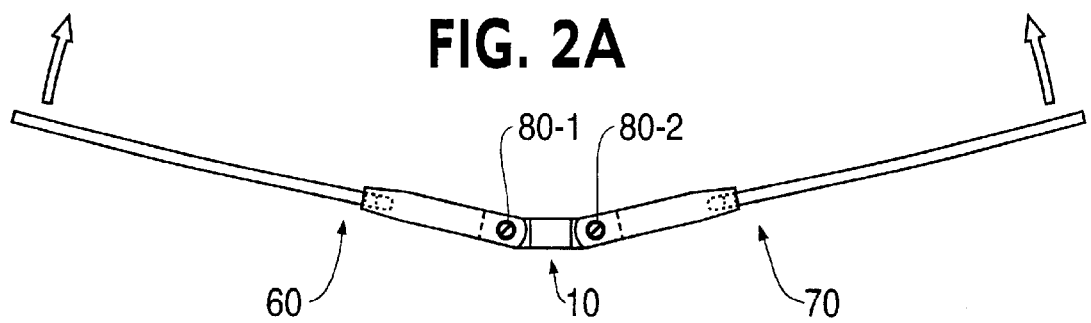
FIG. 2A is a partial plan view of the foldable eyewear configuration according to the first embodiment of the present invention showing the foldable eyewear in a mostly opened position.
Figure 2B:
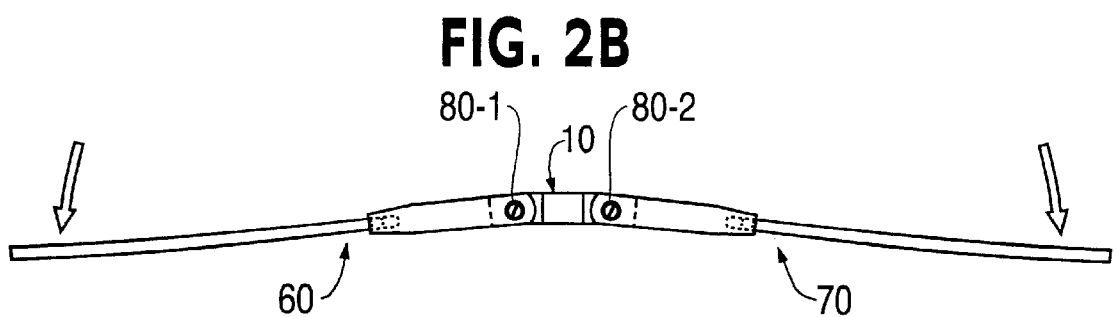
FIG. 2B is a partial plan view of the foldable eyewear configuration according to the first embodiment of the present invention showing the foldable eyewear in a "hyper-extended" position.
Figure 2C:
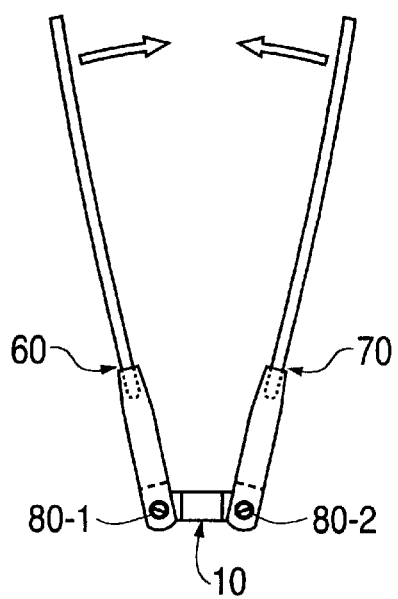
FIG. 2C is a partial plan view of the foldable eyewear configuration according to the first embodiment of the present invention showing the foldable eyewear in a substantially closed position.
Figure 2D:
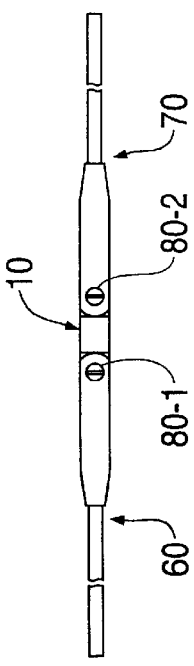
FIG. 2D is a partial plan view of the foldable eyewear configuration according to the first embodiment of the present invention showing hinged connections between a bridge and lens rim-bridge connectors.

FIG. 2A is a partial plan view showing elements of eyewear 100 in a substantially open position (i.e., at approximately 180°). FIG. 2A illustrates screws 80-1 and 80-2 that respectively join one end of the first lens rim-bridge connector 60 and the second lens rim-bridge connector 70 to an end of the bridge 10, thereby forming axes of rotations for the first lens rim 40 and the second lens rim 50. Although screws are illustrated in the exemplary implementation illustrated in FIG. 2 for this purpose, it should be recognized that various alternative mechanisms, such as rivets, clamps, etc., may be utilized to join the first and second lens rims-bridge connectors 60, 70 to the bridge 10. FIG. 2B is a plan view showing elements of eyewear 100 after force is applied to pivot the first lens rim-bridge connector 60 and the second lens rim-bridge connector 70 in a direction opposite to the folding direction shown in FIG. 2A. In other words, the first and second lens rim-bridge connectors 60, 70 are able to "hyper-extend" by partially rotating about their respective axes of rotation in a non-folding direction. By allowing such hyper-extension, the eyewear 100 is able to absorb impact/force that might otherwise damage the eyewear. FIG. 2C is a plan view showing elements of the eyewear 100 in a substantially folded position, achieved by rotating the first and second lens rim-bridge connectors 60, 70 about their respective axes of rotation formed by screws 80-1, 80-2. FIG. 2D is a partial plan view showing connection of the first and second lens rim-bridge connectors 60, 70 to opposite ends of the bridge 10 via screws 80-1, 80-2.

Figure 2E:
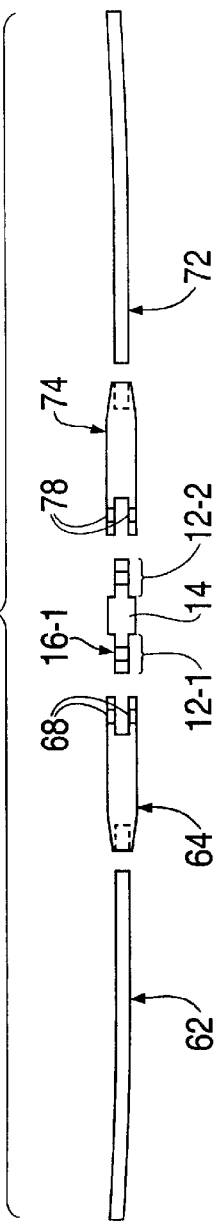
FIG. 2E is a partial, exploded front view of the foldable eyewear configuration according to the first embodiment of the present invention showing elements for providing hinged connections between a bridge and lens rim-bridge connectors.
Figure 2F:
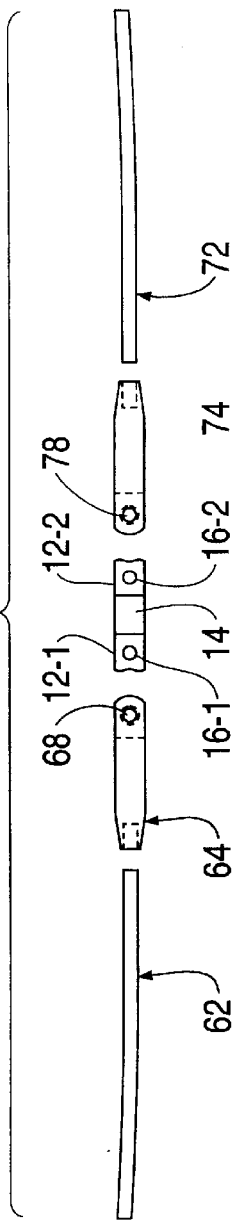
FIG. 2F is a partial, exploded plan view of the foldable eyewear configuration according to the first embodiment of the present invention showing elements for providing hinged connections between a bridge and lens rim-bridge connectors.

FIG. 2E is partial, exploded front view of elements of the eyewear 100 according to the first embodiment of the present invention showing elements for providing hinged connections between the bridge 10 and the first and second lens rim-bridge connectors 60, 70. FIG. 2F is a partial, exploded plan view of the foldable eyewear 100 configuration according to the first embodiment of the present invention showing elements for providing hinged connections between the bridge 10 and the first and second lens rim-bridge connectors 60, 70. As shown in FIG. 2E, the first lens rim-bridge connector 60 includes a stem portion 62, connecting at one end to the first lens rim 40, and a forked end 64 for extending over and joining to a first stepped end 12-1 of the bridge 10. Similarly, the second lens rim-bridge connector 70 includes a stem portion 72, connecting at one end to the second lens rim 50, and a forked end 74 for extending over and joining to a second stepped end 12-2 of the bridge 10. The bridge 10 also includes a center region 14 that is substantially the same height as the forked ends 64, 74 of the first and second lens rim-bridge connectors 60, 70 so that the forked ends 64, 74 and the center region 14 of the bridge 10 appear as an essentially unitary construction when the eyewear 100 is in the non-folded position (clearly seen in FIG. 1A).

As seen in FIGS. 2E and 2F, the forked end 64 of the first lens rim-bridge connector 60 includes a pair of holes 68 (one hole per fork) that align with a first hole 16-1 provided in the first stepped end 12-1 of the bridge 10 to receive the first screw 80-1 and provide a hinged connection between the bridge 10 and the first lens rim-bridge connector 60. Similarly, the forked end 74 of the second lens rim-bridge connector 70 includes a pair of holes 78 (one hole per fork) that align with a second hole 16-2 provided in the second stepped end 12-2 of the bridge 10 to receive the second screw 80-2 and provide a hinged connection between the bridge 10 and the second lens rim-bridge connector 70.

Figure 3A:
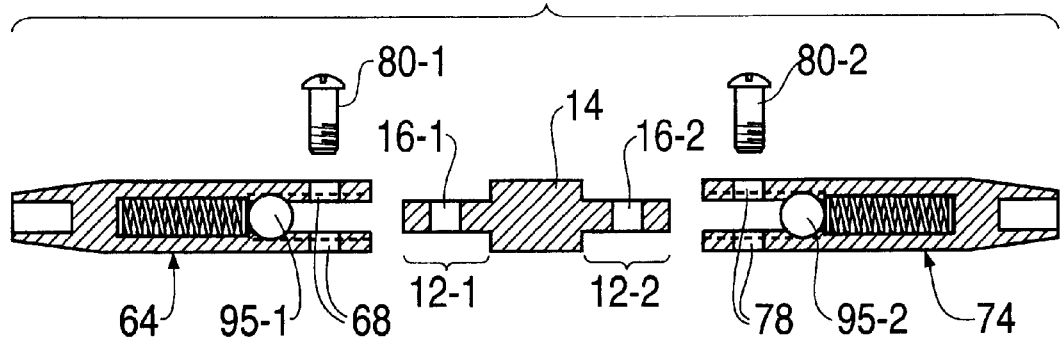
FIG. 3A is partial, cross-sectional exploded view of the foldable eyewear configuration according to the first embodiment of the present invention showing elements that provide spring-hinged connections between a bridge and lens rim-bridge connectors.
Figure 3B:
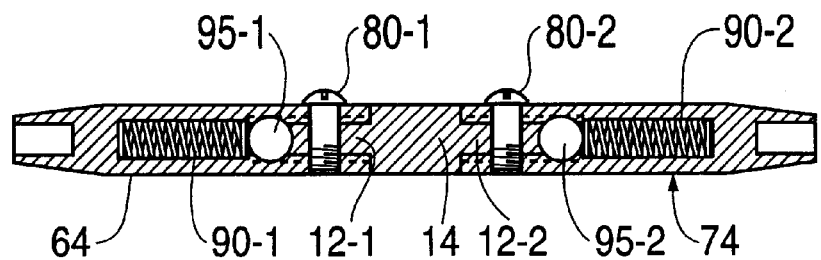
FIG. 3B is a partial, cross-sectional view of the foldable eyewear configuration according to the first embodiment of the present invention showing elements that provide spring-hinged connections between a bridge and lens rim-bridge connectors.

FIG. 3A is partial, cross-sectional, exploded front view of elements of the foldable eyewear 100 according to the first embodiment of the present invention for providing spring-hinged connections between the bridge 10 and the first and second lens rim-bridge connectors 60, 70. FIG. 3B is a partial, cross-sectional, non-exploded front view of elements of the foldable eyewear 100 according to the first embodiment of the present invention for providing spring-hinged connections between the bridge 10 and the first and second lens rim-bridge connectors 60, 70. As shown in FIGS. 3A and 3B, the forked end 64 of the first lens rim-bridge connector 60 includes a hollow cavity for housing a first spring 90-1 and further includes a first stopper 95-1 between the forks. Likewise, the forked end 74 of the second lens rim-bridge connector 70 has a hollow cavity for housing a second spring 90-2 and further includes a second stopper 95-2.

For the spring-hinged connection illustrated in FIG. 3B, the first spring 90-1 is compressed in the hollow cavity of the forked end 64 by the first stopper 95-1 and the position of the first stepped end 12-1 of the bridge 10 between the forks of the forked end 64 of the first lens rim-bridge connector 60. Likewise, the second spring 90-2 is compressed in the hollow cavity of the forked end 74 of the second lens rim-bridge connector 70 by the second stopper 95-2 and the position of the second stepped end 12-2 of the bridge 10 between the forks of the forked end 74 of the second lens rim-bridge connector 70. Due to the force exerted by the compressed springs 901 and 90-2 against the bridge 10, via the first stopper 95-1 and the second stopper 95-2 respectively, stable hinged connections are provided between the first and second lens rim-bridge connectors 60, 70 and the bridge 10, thereby prevented unwanted movement/instability and transitions between the unfolded and folded positions of the eyewear 100.

As shown in the exploded plan view of FIG. 2F, the first and second stepped ends 12-1, 12-2 of the bridge 10 have asymmetric end shapes that, while providing sufficient clearance for the first and second lens rim-bridge connectors 60, 70 to rotate to fully folded positions, allow only limited rotation (e.g., +/−10°) of the first and second lens rim-bridge connectors 60, 70 in the hyper-extended direction. More specifically, although the first and second stoppers 95-1, 95-2 move within the hollow cavities of the forked ends 64, 74 to compress the first and second springs 90-1, 90-2 according to force applied by the first and second stepped ends 12-1, 12-2 of the bridge 10, the first and second stoppers 95-1, 95-2 press far enough against the springs 90-1, 90-2 within the hollow cavities of the forked ends 64, 74 to allow clearance of the asymmetric ends of the first and second stepped ends 12-1, 12-2 of the bridge 10 when the first and second lense rim-bridge connectors 60, 70 rotate in the hyper-extended direction.

In accordance with the folding eyewear configuration of the first embodiment, a separate spring-hinge mechanism is provided for each lens rim which can be folded, one on top of the other. Because the spring for each lens rim is provided in a narrow cavity within a lens rim-bridge connector that is essentially the same height as a bridge portion, a bulky appearance for the spring-hinged connection is avoided while providing a stable folding configuration.

Figure 4A:
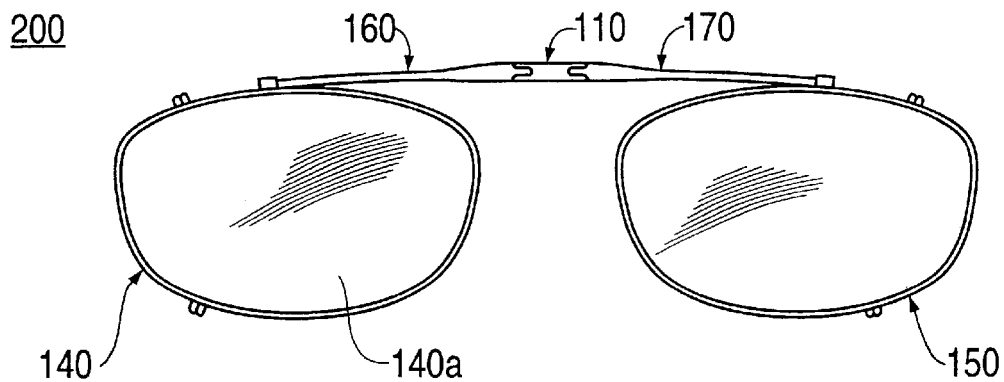
FIGS. 4A, 4B, and 4C are perspective views of foldable eyewear according to a second embodiment of the present invention, showing the foldable eyewear in a fully opened position, a partially closed position, and a fully closed position, respectively.
Figure 4B:
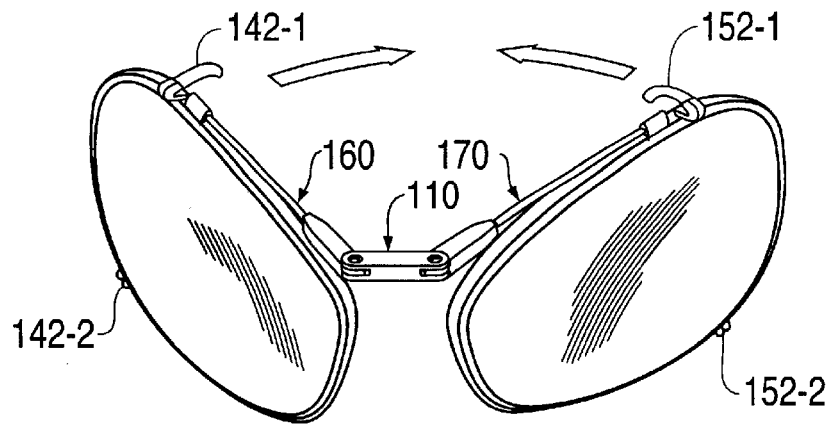
Figure 4C:
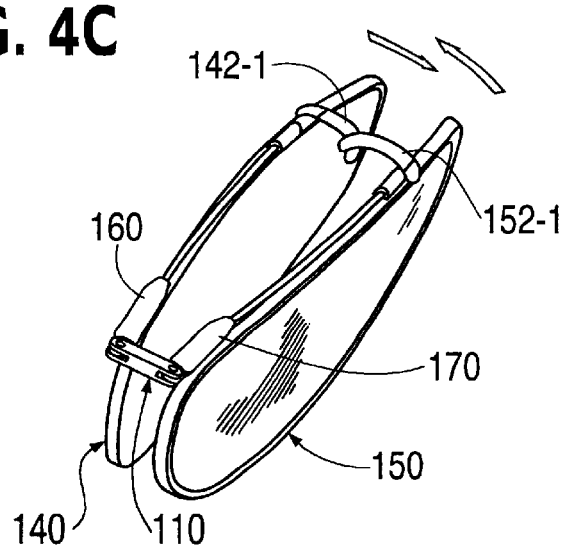

FIGS. 4A–4C are perspective views of foldable eyewear 200 according to a second embodiment of the present invention. As shown in FIG. 4A, the eyewear 200 includes: a first lens rim 140 enclosing a first lens 140a; a second lens rim 150 enclosing a second lens 150a; a double-forked bridge 110; a first lens rim-bridge connector 160 attached at one end to the first lens rim 140 and connected at an opposite end to a first end of the bridge 110; and a second lens rim-bridge connector 170 attached at one end to the second lens rim 150 and connected at an opposite end to a second end of the bridge 110. Like the first embodiment, the eyewear 200 illustrated in FIGS. 4A–4C is a pair of auxiliary glasses, such as clip-on sunglass fronts or safety lenses. To enable attachment of the eyewear 200 to a pair of primary glasses (not shown), the eyewear 200 further includes protruding hooks 142-1, 142-2 (on the first lens rim 140) and 152-1, 152-2 (on the second lens rim 150) for attaching and securing the eyewear 200 to the rims of the user's primary glasses. These hooks 142-1, 142-2, 152-1, and 152-2 can be more clearly seen in FIGS. 4B and 4C.

Figure 5A:
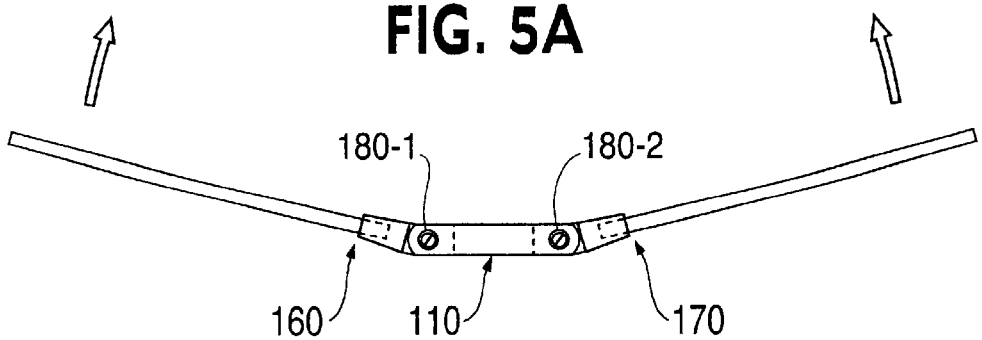
FIG. 5A is a partial plan view of the foldable eyewear configuration according to the second embodiment of the present invention showing the foldable eyewear in a mostly opened position.
Figure 5B:
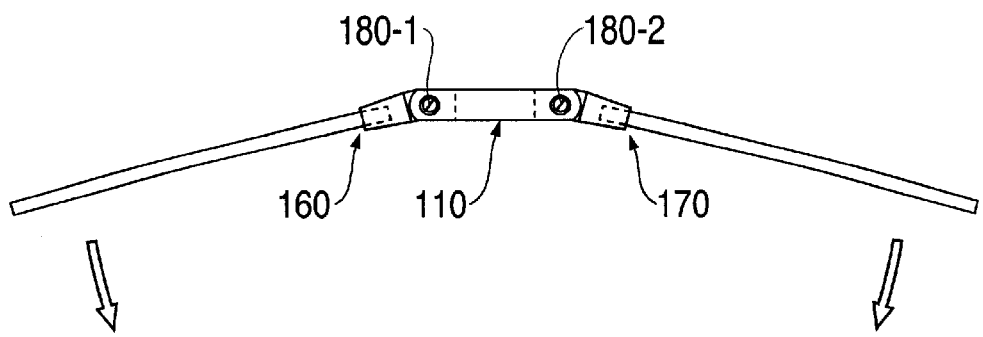
FIG. 5B is a partial plan view of the foldable eyewear configuration according to the second embodiment of the present invention showing the foldable eyewear in a "hyper-extended" position.
Figure 5C:
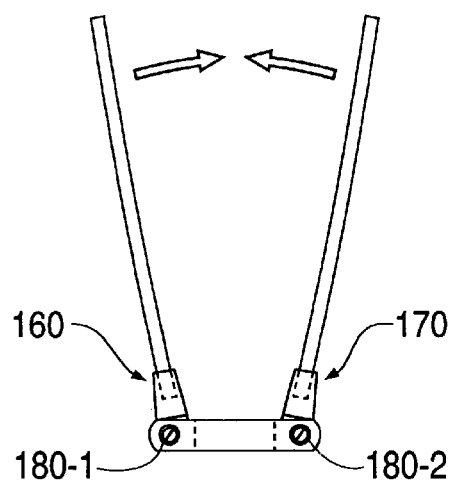
FIG. 5C is a partial plan view of the foldable eyewear configuration according to the second embodiment of the present invention showing the foldable eyewear in a substantially closed position.

FIG. 5A is a partial plan view showing elements of eyewear 200 in a substantially opened position. FIG. 5A illustrates screws 180-1 and 180-2 that respectively join one end of the first lens rim-bridge connector 160 and the second lens rim-bridge connector 170 to an end of the bridge 110, thereby forming axes of rotations of the first lens rim 140 and the second lens rim 150. Although screws are illustrated in the exemplary implementation illustrated in FIGS. 5A–5C, it should again be recognized that various alternative mechanisms, such as rivets, clamps, etc., may be utilized to join the first and second lens rims-bridge connectors 160, 170 to the bridge 110. FIG. 5B is a plan view showing elements of eyewear 200 after force is applied to pivot the first lens rim-bridge connector 160 and the second lens rim-bridge connector 170 in a direction opposite to the folding direction shown in FIG. 5A. In other words, like in the first embodiment, the first and second lens rim-bridge connectors 160, 170 are able to "hyper-extend" by partially rotating about their respective axes of rotation in a non-folding direction. FIG. 5C is a partial plan view showing elements of the eyewear 200 in a substantially folded position, achieved by rotating the first and second lens rim-bridge connectors 160, 170 about their respective axes of rotation formed by screws 180-1 and 180-2.

Figure 5D:
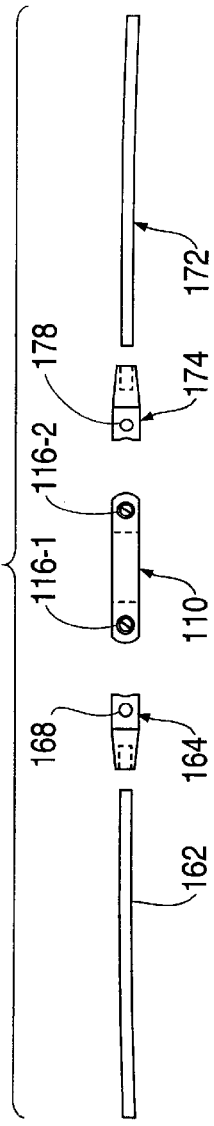
FIG. 5D is a partial, exploded plan view of the foldable eyewear configuration according to the second embodiment of the present invention showing hinged connections between a bridge and lens rim-bridge connectors.
Figure 6A:
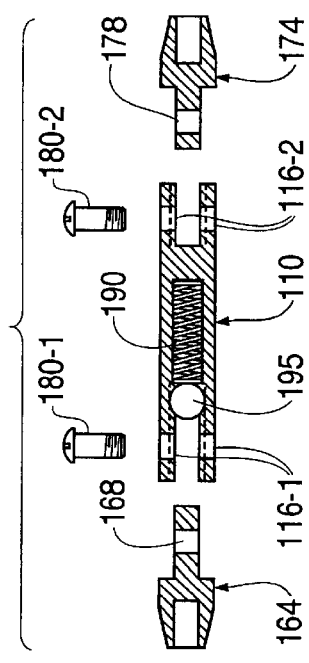
FIG. 6A is a partial, cross-sectional, exploded view of the foldable eyewear configuration according to the second embodiment of the present invention showing elements that provide a spring-hinged connection between a bridge and a lens rim-bridge connector.
Figure 6B:
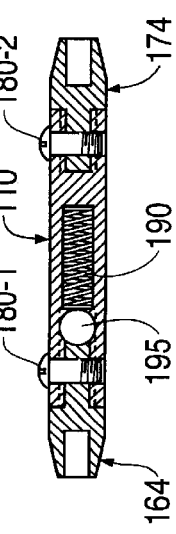
FIG. 6B is a partial, cross-sectional view of the foldable eyewear configuration according to the second embodiment of the present invention showing elements that provide a spring-hinged connection between a bridge and a lens rim-bridge connector.

FIG. 5D is partial, exploded plan view of elements of the eyewear 200 configuration according to the second embodiment of the present invention, showing elements for providing hinged connections between the bridge 110 and the first and second lens rim-bridge connectors 160, 170. As shown in FIG. 5D, the first lens rim-bridge connector 160 includes a stem portion 162, connecting at one end to the first lens rim 140, and a stepped end 164 for fitting between and joining to a first forked end 112-1 of the bridge 110. Similarly, the second lens rim-bridge connector 170 includes a stem portion 172, connecting at one end to the second lens rim 150, and a stepped end 174 for fitting between and joining to a second forked end 112-2 of the bridge 110. FIG. 6A is a cross-sectional, exploded front view of elements of the foldable eyewear 200 according to the second embodiment of the present invention for providing a spring-hinged connection between the bridge 110 and the first rim-bridge connector 160 and a hinged connection between the bridge 110 and the second lens rim-bridge connector 170. FIG. 6B is a cross-sectional, non-exploded front view of elements of the foldable eyewear 200 according to the second embodiment of the present invention for providing a spring-hinged connection between the bridge 110 and the first lens rim-bridge connector 160 and a hinged connection between the bridge 110 and the second lens rim-bridge connector 170.

As seen in FIGS. 5D and 6A, a first forked end of the bridge 110 includes a first pair of holes 116-1 and a second forked end of the bridge 110 includes a second pair of holes 116-2. The stepped portion 164 of the first lens rim-bridge connector 160 includes a hole 168-1 that aligns between the holes 116-1 formed in the first forked end of the bridge 110 to receive the first screw 180-1 and, thus, provide a hinged connection between the bridge 110 and the first lens rim-bridge connector 160. Similarly, the stepped portion 174 of the second lens rim-bridge connector 170 includes a hole 168-2 that aligns between the second pair of holes 116-2 formed in the second forked end of the bridge 110 to receive the second screw 180-2 and, thus, provide a hinged connection between the bridge 110 and the second lens rim-bridge connector 170.

As shown in FIGS. 6A and 6B, the first forked end of the bridge 110 includes a hollow cavity for housing a spring 190 and further includes a stopper 195 between the forks. For the spring-hinged connection illustrated in FIG. 6B, the spring 190 is compressed in the hollow cavity of the first forked end of the bridge 110 by the stopper 195 and the fixed position of the stepped portion 164 of the first lens rim-bridge connector 160 between the forks of the first forked end of the bridge 110. Due to the force exerted by the compressed spring 190 against the first lens rim-bridge connector 160, via the first stopper 195, a stable hinged connection is provided between the first lens rim-bridge connector 160 and the bridge 110, thereby prevented unwanted movement/instability and transitions between the unfolded and folded positions of the first lens rim-bridge connector 160. It should be recognized that the configuration shown in FIGS. 6A and 6B may be modified by providing a second spring-stopper combination within the second forked end of the bridge 110 so as to provide a separate spring-hinged connection for the second lens rim-bridge connector 170.

As shown in the exploded plan view of FIG. 5D, the stepped portions 164, 174 of the first and second lens rim-bridge connectors 160, 170 have asymmetric end shapes that, while providing sufficient clearance for the first and second lens rim-bridge connectors 160, 170 to rotate to fully folded positions, allow only limited rotation (e.g., +/−10°) of the first and second lens rim-bridge connectors 160, 170 in the hyper-extended direction.

The foregoing description of the preferred embodiments of the invention has been presented for purposes of illustration and description. This description is not intended to be exhaustive or limit the invention to the precise form disclosed, and modifications and variations are possible in light of the above teachings or may be acquired from practice of the invention. The embodiments have been chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. Foldable eyewear, comprising:
   a bridge;
   a first lens rim;
   a second lens rim;
   a first lens rim-bridge connector rotatably connecting said first lens rim to said bridge, said first lens rim-bridge connector having a cavity that houses a compressed spring, said compressed spring exerting force against said bridge to provide a stable hinged connection between said first lens rim and said bridge; and
   a second lens rim-bridge connector rotatably connecting said second lens rim to said bridge, wherein said first and second lens rims rotate relative to said bridge to be substantially parallel,
   wherein said hinged connection between said first lens rim-bridge connector and said bridge is configured for rotation of said first lens rim-bridge connector from an unfolded position, in which said first lens rim-bridge connector is aligned with said bridge, to a folded position, in which said first lens rim-bridge connector is substantially perpendicular to said bridge, said hinged connection between said first lens rim-bridge connector and said bridge further being configured for rotation of said first lens rim-bridge connector from said unfolded position, in an opposite rotation direction than the rotation direction for reaching said folded position, to a hyper-extended position.

2. The foldable eyewear of claim 1, wherein said second lens rim-bridge connector includes a cavity that houses a second compressed spring, said second compressed spring exerting force against said bridge to provide a stable hinged connection between said second lens rim and said bridge.

3. The foldable eyewear of claim 1, wherein
   said bridge has a first stepped portion that is rotatably joined to said first lens rim-bridge connector and a second stepped portion that is rotatably joined to said second lens rim-bridge connector,
   said first lens rim-bridge connector has a forked end that overlaps and joins to said first stepped portion of said bridge, and
   said second lens rim-bridge connector has a forked end that overlaps and joins to said second stepped portion of said bridge.

4. The foldable eyewear of claim 3, wherein
   the forked end of said first lens rim-bridge connector includes a stopper that exerts force from said first stepped portion of said bridge against said spring.

5. The foldable eyewear according to claim 1, wherein said eyewear is auxiliary eyewear that further comprises means for attaching to a user's primary glasses.

6. The foldable eyewear of claim 1, wherein said hinged connection between said first lens rim-bridge connector and said bridge is configured so that rotation of said first lens rim-bridge connector in said opposite rotation direction is limited to an angle that is substantially less than the rotation angle required for rotation of said first lens rim-bridge connector from said unfolded position to said folded position.

7. The foldable eyewear of claim 6, wherein said bridge has an end region that is connected to said first lens rim-bridge connector to provide an axis of rotation, said end region being shaped to allow rotation of said first lens rim-bridge connector between said unfolded and folded positions and to restrict rotation of said first lens rim-bridge connector in said opposite rotation direction to said hyper-extended position.

8. The foldable eyewear of claim 7, wherein said end region of said bridge is a stepped portion that is overlapped by, and rotatably joined to, a forked end of said first lens rim-bridge connector.

9. Foldable eyewear, comprising:
   a bridge;
   a first lens rim;
   a second lens rim;
   a first lens rim-bridge connector rotatably connecting said first lens rim to said bridge; and
   a second lens rim-bridge connector rotatably connecting said second lens rim to said bridge, wherein said first and second lens rims rotate relative to said bridge to be substantially parallel, said bridge includes a cavity that houses a compressed spring, said compressed spring exerting force against said first lens rim-bridge connector to provide a stable hinged connection between said first lens rim-bridge connector and said bridge, and said hinged connection between said first lens rim-bridge connector and said bridge is configured for rotation of said first lens rim-bridge connector from an unfolded position, in which said first lens rim-bridge connector is aligned with said bridge, to a folded position, in which said first lens rim-bridge connector is substantially perpendicular to said bridge, said hinged connection between said first lens rim-bridge connector and said bridge further being configured for rotation of said first lens rim-bridge connector from said unfolded position, in an opposite rotation direction than the rotation direction for reaching said folded position, to a hyper-extended position.

10. The foldable eyewear of claim 9, wherein said first lens rim-bridge connector has a stepped portion that is overlapped by and rotatably joined to a first forked end of said bridge, and said second lens rim-bridge connector has a stepped portion that is overlapped by and rotatably joined to a second forked end of said bridge.

11. The foldable eyewear of claim 10, wherein said first forked end portion of said bridge includes a stopper that exerts force from the stepped portion of said first lens rim-bridge connector against said spring.

12. The foldable eyewear of claim 9, wherein said eyewear is auxiliary eyewear that further comprises means for attaching to a user's primary glasses.

13. The foldable eyewear of claim 9, wherein said hinged connection between said first lens rim-bridge connector and said bridge is configured so that rotation of said first lens rim-bridge connector in said opposite rotation direction is limited to an angle that is substantially less than the rotation angle required for rotation of said first lens rim-bridge connector from said unfolded position to said folded position.

14. The foldable eyewear of claim 13, wherein said first lens rim-bridge connector has an end region that is connected to said bridge to provide an axis of rotation, said end region being shaped to allow rotation of said first lens rim-bridge connector between said unfolded and folded positions and to restrict rotation of said first lens rim-bridge connector in said opposite rotation direction to said hyper-extended position.

15. The foldable eyewear of claim 14, wherein said end region of said first lens rim-bridge connector is a stepped portion that is overlapped by, and rotatably joined to, a forked end of said bridge.

* * * * *